United States Patent [19]

Takano

[11] Patent Number: 5,609,814
[45] Date of Patent: Mar. 11, 1997

[54] OPTICAL MOLDING PROCESS

[75] Inventor: Yoichi Takano, Tokyo, Japan

[73] Assignee: Sony Corporation, Tokyo, Japan

[21] Appl. No.: 560,152

[22] Filed: Nov. 20, 1995

Related U.S. Application Data

[63] Continuation of Ser. No. 215,375, Mar. 21, 1994, abandoned.

[30]    Foreign Application Priority Data

Mar. 22, 1993   [JP]   Japan ................................ 5-061583

[51] Int. Cl.$^6$ ............................ B29C 35/08; B29C 41/02
[52] U.S. Cl. ................ 264/401; 156/273.3; 156/273.5; 156/275.5; 156/307.1; 264/308; 427/510; 427/512; 427/553; 427/554; 427/555
[58] Field of Search ...................................... 264/308, 401; 156/273.3, 273.5, 275.5, 307.1; 427/510, 512, 553, 554, 555

[56]    References Cited

U.S. PATENT DOCUMENTS

| | | | |
|---|---|---|---|
| 4,575,330 | 3/1986 | Hull ........................................ | 264/22 X |
| 5,011,635 | 4/1991 | Murphy et al. ........................ | 264/401 |
| 5,058,988 | 10/1991 | Spence ................................ | 264/401 X |
| 5,106,288 | 4/1992 | Hughes ................................ | 264/401 X |
| 5,248,249 | 9/1993 | Yamamoto et al. .................. | 264/22 X |

FOREIGN PATENT DOCUMENTS

| | | |
|---|---|---|
| 361847 | 4/1990 | European Pat. Off. . |
| 376571 | 7/1990 | European Pat. Off. ................. 264/22 |
| 4-185425 | 7/1992 | Japan ................................... 425/174.4 |
| WO90/06540 | 6/1990 | WIPO . |

OTHER PUBLICATIONS

European Search Report (for EP 94104239), dated Jun. 8, 1994.

*Primary Examiner*—Leo B. Tentoni
*Attorney, Agent, or Firm*—Hill, Steadman & Simpson

[57]    ABSTRACT

An optical molding process for obtaining a three-dimensional resin model by scanning a surface of a photocurable resin liquid held in a photocurable resin liquid tank by a light beam to cure the same and successively building up the scanned and cured layers on an elevator. When the molding of one constant-height section layer is ended and the elevator is made to descend, the overflow of the photocurable resin liquid from the photocurable resin liquid tank to an overflow tank is temporarily blocked and then after the blocking of the overflow is lifted, the next constant-height section layer is molded.

7 Claims, 4 Drawing Sheets

5,609,814

OPTICAL MOLDING PROCESS

This is a continuation of application Ser. No. 08/215,375, filed Mar. 21, 1994, now abandoned.

BACKGROUND OF THE INVENTION

1. Field of the Invention

The present invention relates to an optical molding process and an optical molding apparatus which mold a desired resin model by scanning and irradiating a photocurable resin such as an ultraviolet light curable resin by a light beam, and more particularly relates to an optical molding process and an optical molding apparatus which quickly returns the level of the liquid surface of the photocurable resin liquid contained in the photocurable resin liquid tank to a constant level so as to shorten the molding time and improve the molding precision.

2. Description of the Related Art

An attempt has been made, for example, to mold a desired resin model by scanning the surface of a tank containing an ultraviolet light curable resin liquid with an ultraviolet light laser, while turning it on and off, so as to cure the same and successively building up scanned and cured layers on an elevator. This resin model is used as a master model for other products, for example, so during molding it is necessary to improve the molding precision, the interlayer bonding, and the molding efficiency.

The conventional optical molding process, as shown in FIG. 1, involved generating an ultraviolet light beam 5 from an ultraviolet light laser 4, using an optical system having galvanomirrors and shutters etc. to turn the ultraviolet light laser on and off and control the scanning direction of the beam, and while doing so irradiate the surface of the tank 1 containing an ultraviolet light curable resin liquid 2. In the tank was provided an elevator 8 which blocked the ultraviolet light laser and could be made to ascend and descend. The resin liquid present between the surface 3 of the resin liquid and the elevator 8 was cured by the ultraviolet light laser beam 5.

In the first step of the molding process, the elevator 8 is made to ascend and the resin liquid 2 present between the resin liquid surface 3 and the elevator 8 is cured by the ultraviolet light laser beam 5 to form an n-th scanned and cured layer 7a, then the elevator 8 is made to descend and the same procedure as with the n-th layer is followed to form an (n+1)th scanned and cured layer 7b on the n-th scanned and cured layer 7a. The same procedure is followed so as to successively build up (hereinafter also referred to as "deposit") scanned and cured layers. When the final scanned and cured layer finishes being formed, the elevator 8 is made to ascend and the model 9 is taken out from the resin liquid, then final curing is performed by using an ultraviolet light lamp etc. to irradiate the entire model with ultraviolet light over a long period.

Below, in the present invention, planes at identical pitches of movement of the elevator are referred to as "constant-height sections". In one constant-height section, there will be regions for curing the resin liquid and regions for not curing the resin liquid in accordance with the three-dimensional shape of the desired model.

The ultraviolet light beam generated by the ultraviolet light laser oscillator is used for scanning along the scanning direction by the optical system. During scanning, in regions where the resin liquid is to be cured, the ultraviolet light laser is turned on (in actuality, the shutter AOM is opened) and in regions where the resin liquid is not to be cured, the ultraviolet light laser is turned off (in actuality, the shutter AOM is closed). When one scanning line finishes being scanned, the optical system is controlled to shift in phase by the amount of a scanning pitch and similar scanning is performed along the scanning direction once again.

Note that if an ultraviolet light beam is scanned into a resin liquid, the light energy is gradually reduced by the resin liquid, so microscopically speaking, sharp edged irradiated regions (that is, scanned and cured layers) are formed.

The scanned and cured layers of constant-height sections are formed in this way. In successively building up the scanned and cured layers, when forming a top scanned and cured layer, the beam intensity is made enough so that the ultraviolet light beam is irradiated to the bottom layer as well, that is, the depth of curing in the constant-height section is controlled to be greater than the built-up thickness, so as to improve the bonding between layers.

When molding the next scanned and cured layer after molding a scanned and cured layer at one constant-height section, as mentioned above, the elevator 8 is made to descend. However, the descent of the elevator is accompanied by an increase in the immersed volume of the elevator (mainly the support rods of the elevator), which causes photocurable resin liquid to overflow from the photocurable resin liquid tank. An overflow tank 13 is provided at the outside of the top edge 11 of one side of the photocurable resin liquid tank to receive the overflow.

To return the photocurable resin liquid 2 which overflowed at the time of the descent of the elevator once again to the photocurable resin liquid tank, provision is a recirculation pump 14 is provided between the photocurable resin liquid tank 1 and the overflow tank 13. Note that this recirculation pump has the function of agitating an anaerobic photocurable resin liquid in addition to that of returning the overflowed photocurable resin liquid to the photocurable resin liquid tank.

However, in a conventional optical molding apparatus, since the photocurable resin liquid is high in viscosity, when the elevator was made to descend, there was the problem of too much of an overflow. The narrower the gap between the elevator and the tank wall during the descent of the elevator, the faster the flow rate of the photocurable resin liquid passing through it and the more the photocurable resin liquid flowing out into the overflow tank.

In particular, to maintain the liquid surface constant, in actual operation, when the elevator was made to descend, the elevator was intentionally immersed to more than the thickness of the scanned and cured layer next to be molded, then was made to ascend to the normal position. This resulted in the problem that rippling of the liquid surface was aggravated and the amount of photocurable resin liquid which overflowed increased as well.

This problem becomes more conspicuous the closer the elevator is to the liquid surface.

If the light beam scans with a low liquid surface in this way, since it is taught that the control of the optical system requires first that the liquid surface be at its normal position, the precision of the molded model will be damaged. Therefore, in the past, scanning was delayed until the liquid surface rose due to the photocurable resin liquid returned by the recirculation pump and after it was confirmed that the liquid surface had risen to its normal position, the next scanned and cured layer was molded. Accordingly, there was waste in the molding time. Improvement in molding time is provided by the present invention.

If the amount of the flow of the recirculation pump is increased, the liquid surface of the photocurable resin liquid tank could be quickly restored. However, if this measure is employed, there are the problems that rippling on the liquid surface becomes greater that requires time to settle down. Also, by increasing the amount of liquid returned to the photocurable resin liquid tank, the liquid surface rises above its normal position.

The present invention was made in consideration of these problems in the prior art and has as its object quickly returning the position of the liquid surface of the photocurable resin liquid stored in the photocurable resin liquid tank to a constant position so as to shorten the molding time and improve the molding precision.

SUMMARY OF THE INVENTION

To achieve the above-mentioned object, the optical molding process of the present invention provides an optical molding process for obtaining a three-dimensional resin model by scanning a surface of a photocurable resin liquid accommodated in a photocurable resin liquid tank. The resin liquid is scanned by a light beam to cure the same and successively builds up scanned and cured layers on an elevator. When the molding of one constant-height section layer is ended and the elevator is made to descend, the overflow of the photocurable resin liquid from the photocurable resin liquid tank to an overflow tank is temporarily blocked and then after the blocking of the overflow is released, the next constant-height section layer is molded.

The elevator descends to a depth greater than the thickness of the constant-height section layer to be next molded, then ascends to the thickness position of the constant-height section layer.

Preferably, when blocking the overflow of the photocurable resin liquid, the recirculation between the photocurable resin liquid tank and the overflow tank is stopped.

To achieve the above object, the optical molding apparatus of the present invention provides:

a photocurable resin liquid tank in which a photocurable resin liquid is filled, an overflow tank which accommodates photocurable resin liquid which overflows from the photocurable resin liquid tank, an optical scanning unit for generating a light beam including a wavelength suitable for curing the photocurable resin liquid, an elevator unit for causing the cured resin produced by the irradiation of the light beam on the surface of the photocurable resin liquid to ascend and descend, a dam unit for blocking and releasing the photocurable resin liquid overflowing from the photocurable resin liquid to the overflow tank, and a control unit for controlling the blocking and releasing of the overflow of the photocurable resin liquid by the dam unit.

Preferably, the control unit controls the elevator unit and the dam unit so as to temporarily block by the dam unit the overflow of the photocurable resin liquid overflowing from the photocurable resin liquid tank to the overflow tank, release the blocking of the overflow by the dam unit, and then mold the next constant-height section layer.

Preferably, the optical molding apparatus of the present invention has a recirculation unit for returning to the photocurable resin liquid tank the photocurable resin liquid overflowing from the photocurable resin liquid tank to the overflow tank. The control unit stops the recirculation unit when blocking the overflow of the photocurable resin liquid by the dam unit.

In the present invention, according to one method, when the formation of the scanned and cured layer at one constant-height section is ended, the elevator is made to descend by exactly the thickness of the constant-height section to be next molded. Since the photocurable resin liquid overflows too much from the photocurable resin liquid tank to the overflow tank when the elevator is made to descend, a dam unit is used to temporarily block the overflow and further the recirculation unit is stopped to allow the liquid surface of the photocurable resin liquid to settle, then the dam unit is opened so as to allow overflow of exactly the amount of the photocurable resin liquid which should truly overflow.

A light beam including a wavelength suitable for curing the photocurable resin liquid is generated from the optical scanning unit and this light beam is made to scan the photocurable resin liquid contained in the photocurable resin liquid tank. When the scanning at one constant-height section ends, the cured resin produced by the irradiation of the light beam is made to ascend and descend by the elevator unit. This routine is repeated to successively build up scanned and cured layers.

When a signal is received at the control unit from the optical scanning unit to the effect that the scanning at one constant-height section has ended, a signal is output to the elevator unit to cause it to descend by exactly the thickness of the constant-height section to be next molded.

At the same time as this, a signal is output from the control unit to the dam unit to temporarily block the photocurable resin liquid overflowing from the photocurable resin liquid tank to the overflow tank (at the same time as this, preferably a signal is also output to the recirculation unit to stop).

In this state, the attenuation of the rise of the liquid surface due to the descent of the elevator unit and the rippling of the liquid surface are awaited, then a signal is output from the control unit to the dam unit to release the blocking of the overflow. Further, at the same time, preferably, a signal is output from the control unit to the recirculation unit to start the recirculation between the photocurable resin liquid tank and the overflow tank.

By this, only the amount of the photocurable resin liquid which should truly overflow overflows from the photocurable resin liquid tank to the overflow tank and as a result it is possible to immediately start the scanning at the next constant-height section. Further, the liquid surface at the time of start of the scanning is secured at the normal liquid surface height and, further, rippling is suppressed as well, so the precision of the molded model is remarkably improved.

In particular, the above-mentioned action also works remarkably well when the descent operation of the elevator is selected to descend to a depth greater than the thickness of the constant-height section layer to be next molded, then ascends to the thickness position of the constant-height section layer.

In short, in the present invention, the position of the liquid surface of the photocurable resin liquid contained in the photocurable resin liquid tank can be quickly returned to its constant position and thereby the molding time can be shortened and molding precision improved.

DETAILED DESCRIPTION OF THE PREFERRED EMBODIMENTS

Below, an embodiment of the present invention will be explained with reference to the drawings.

Figure 1:
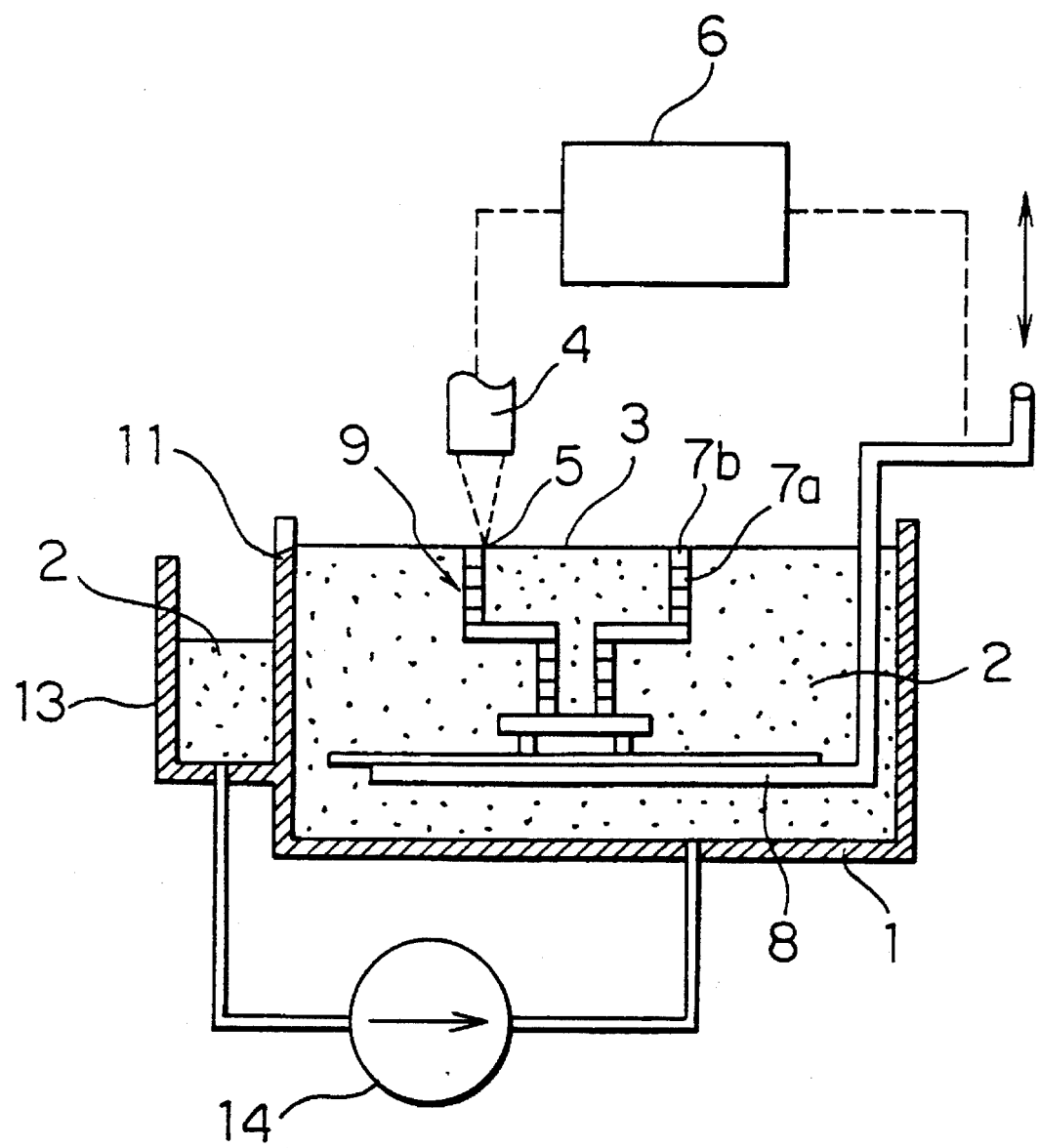
FIG. 1 is a sectional view showing a conventional optical molding apparatus.
Figure 2:
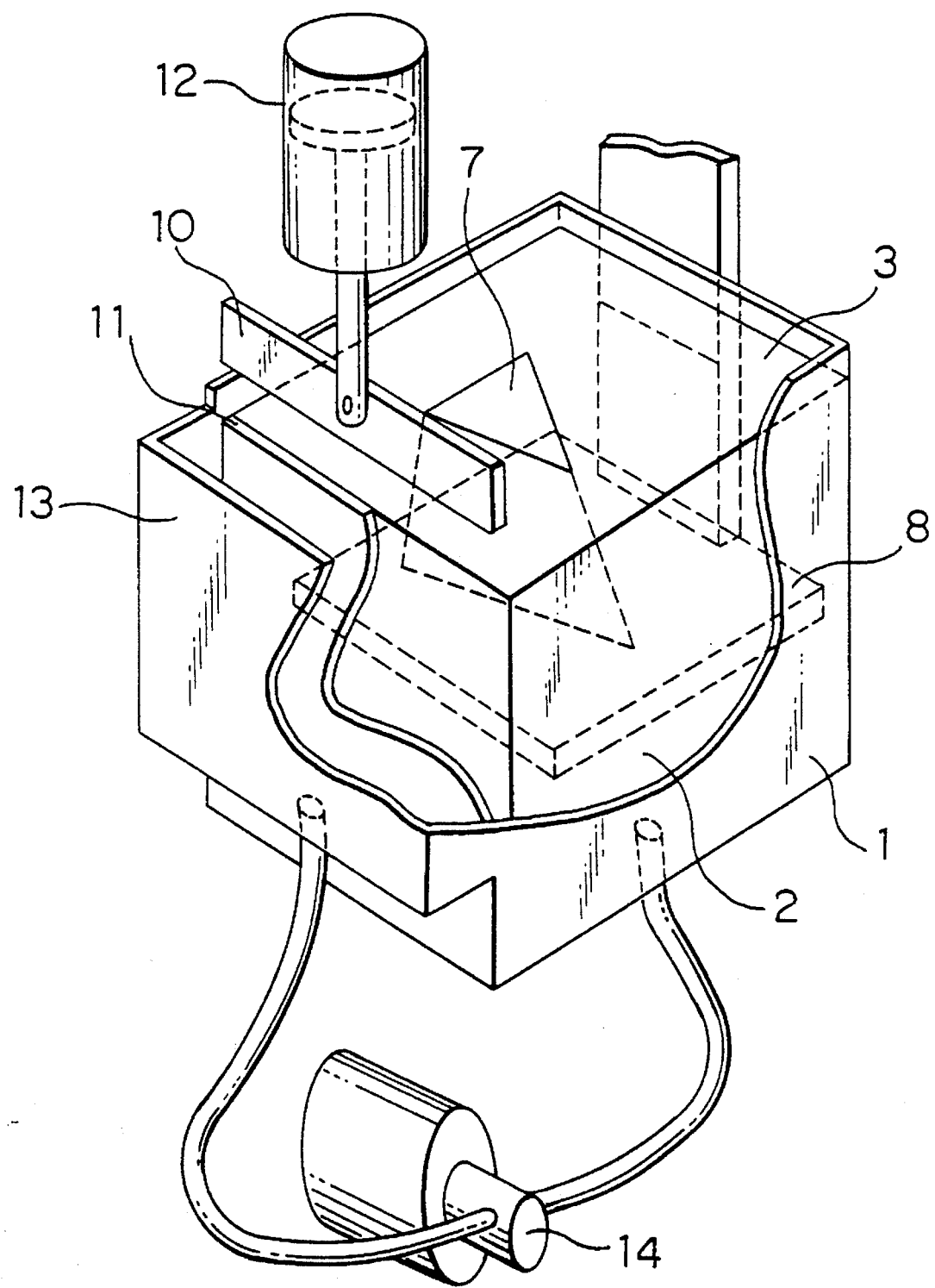
FIG. 2 is a perspective view showing an optical molding apparatus of the present invention.
Figure 3:
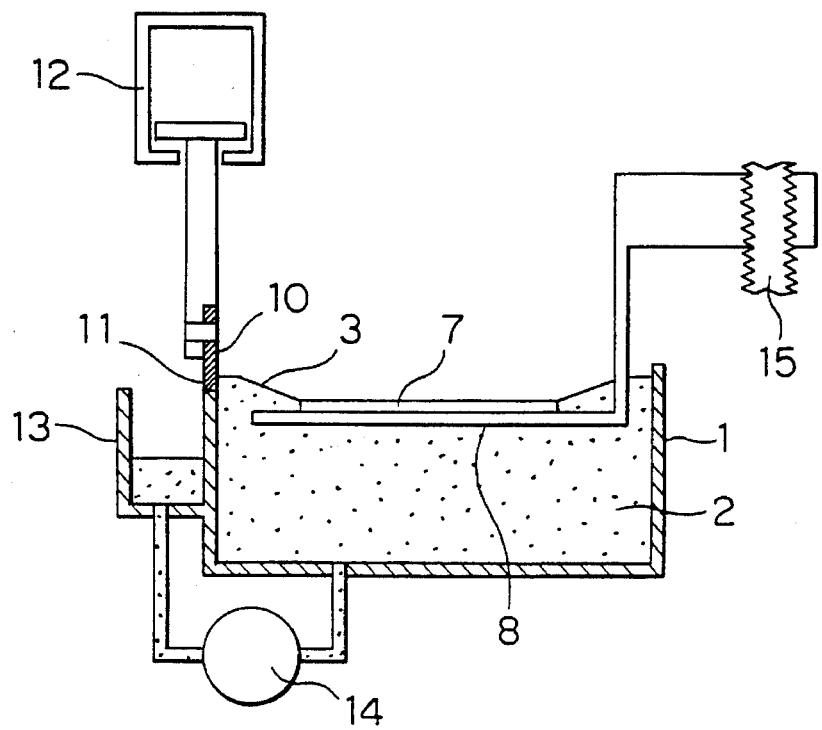
FIG. 3 is a sectional view showing the closed gate state in the embodiment.
Figure 4:
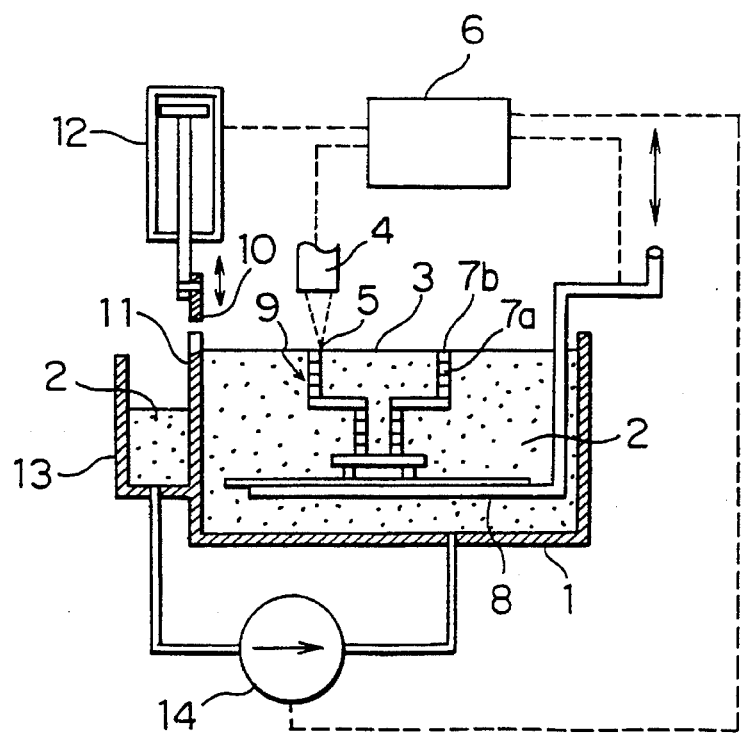
FIG. 4 is a sectional view showing the open gate state in the embodiment.

First, referring to FIG. 2 to FIG. 4, an explanation will be made of the construction of an optical molding apparatus according to an embodiment of the present invention.

The optical molding apparatus of the embodiment has a photocurable resin liquid tank 1. A photocurable resin liquid 2 contained in that tank is material which undergoes addition polymerization and cures upon irradiation by light. For example, styrene, methyl methacrylate, vinyl acetate, or other vinyl monomers undergo polymerization due to irradiation by light even without the presence of a photopolymerization initiator but in the presence of an ultraviolet light absorbing sensitizer or dye.

However, the type of the photocurable resin liquid 2 used in the present invention is not particularly limited. It may be any resin which is liquid in state when uncured and becomes solid due to curing. Further, light 5 irradiated (see FIG. 4) is also not particularly limited. Other light in addition to ultraviolet light may be selected in accordance with the photocurable resin 2 used.

In the photocurable resin liquid tank 1, an elevator 8 is provided which blocks the light beam and has a seat on which the cured resin sits. This elevator 8 can be made to ascend and descend in the photocurable resin liquid tank 1 by an elevator actuator 15 (only thread portion shown in FIG. 3). The command signal of the elevator actuator 15 is given by a control unit 6. The control unit 6 outputs a command signal to the elevator actuator 15 based on information to an optical scanning unit 4 or from the optical scanning unit 4.

For example, when it is detected from the optical scanning unit 4 that the scanning at one constant-height section has ended, to shift to the scanning of the next constant-height section, a command signal is output from the control unit 6 to the elevator actuator 15, by which the elevator actuator 15 causes the elevator 8 to descend by exactly a predetermined pitch (that is, the pitch being the thickness of built-up layers at the constant-height sections).

In particular, to precisely manage the liquid surface 3, when causing the elevator 8 to descend, it is preferable to cause the elevator 8 to once descend deeper than the thickness of the next layer, then ascend to the position of the layer thickness. By making it descend once deeper, photocurable resin liquid is sufficiently filled on the elevator, so even if the viscosity of the photocurable resin liquid is high, the liquid surface on the elevator will not fall.

The optical scanning unit 4 according to the present invention is comprised of a laser oscillator for generating an ultraviolet light laser or other light beam, an optical system for causing the light beam generated by the laser oscillator to scan the surface 3 of the photocurable resin liquid in accordance with a predetermined path, and an optical controller for controlling the optical system.

The optical system is provided with a shutter device (AOM) for passing/blocking the light beam and voltage applicators, galvanomirrors, etc. for changing the direction of the light beam, etc. and has the function of turning the light beam on and off, changing the intensity of the light beam, changing the path of the light, controlling the scanning speed of the light beam, etc. A command signal is output to the optical system from the optical system controller regarding the optical scanning conditions in accordance with a pre-instructed path.

Note that the operation of the optical scanning unit 4 in the present invention is based on the basic data on paths input in advance in the control unit 6.

One side of the photocurable resin liquid tank 1 is formed so that its top edge 11 is lower than the rest of the top edge. The top edge 11 is equal in level with the liquid surface 3. The photocurable resin liquid 2 which overflows from the top edge 11 flows into the overflow tank 13 provided at the outside and further is returned to the photocurable resin liquid tank 1 by recirculation piping and the recirculation pump 14. Note that the recirculation system, including the recirculation pump 14, is designed so that the liquid can flow only in the direction from the overflow tank 13 to the photocurable resin liquid tank 1. Backflow from the photocurable resin liquid tank 1 to the overflow tank 13 is prevented.

At the top edge 11 forming the liquid surface 3 is provided a gate 10 which can be moved close to or away from the top edge 11. This gate 10 is attached to a rod of the actuator 12, such as a hydraulic cylinder, whereby it can be moved reciprocatingly between a position for closing off the top edge 11 and blocking the overflow from the photocurable resin liquid tank (see FIG. 3) and a position rising away from the top edge 11 for allowing overflow from the photocurable resin liquid tank (see FIG. 4). These gate 10 and actuator 12 constitute the dam unit of the present invention.

The operation of the actuator 12 is controlled by a command signal from the control unit 6. Specifically, when the elevator 8 is made to descend, the gate 10 is closed to block the overflow, then when the elevator 8 stops at its normal position, the gate 10 is opened to allow the overflow.

Further, in relation to the control of the gate 10, in the present embodiment, while the gate 10 is closed and the overflow blocked, a command signal is output from the control unit 6 to control part of the recirculation pump 14 so that the recirculation pump 14 also stops. When opening the gate 10 to allow the overflow, a command signal is output from the control unit 6 to the control part of the recirculation pump to once again operate the recirculation pump 14.

The control unit 6 according to the present embodiment performs its control in accordance with the desired resin model based on previously input data while considering the relation with the elevator 8 (elevator unit) and the optical scanning unit 4 and while considering the relation with the gate 10 as mentioned above as well.

Note that in the present embodiment, the control unit of the elevator actuator 15, the optical system controller, the control unit 6, and other data processing units were explained by specific examples of separate units, but this was to facilitate understanding of the individual functions. Of course, in so far as these functions are provided, these units may be combined in any fashion in data processing units.

Next, the mode of operation will be explained.

Figure 5:
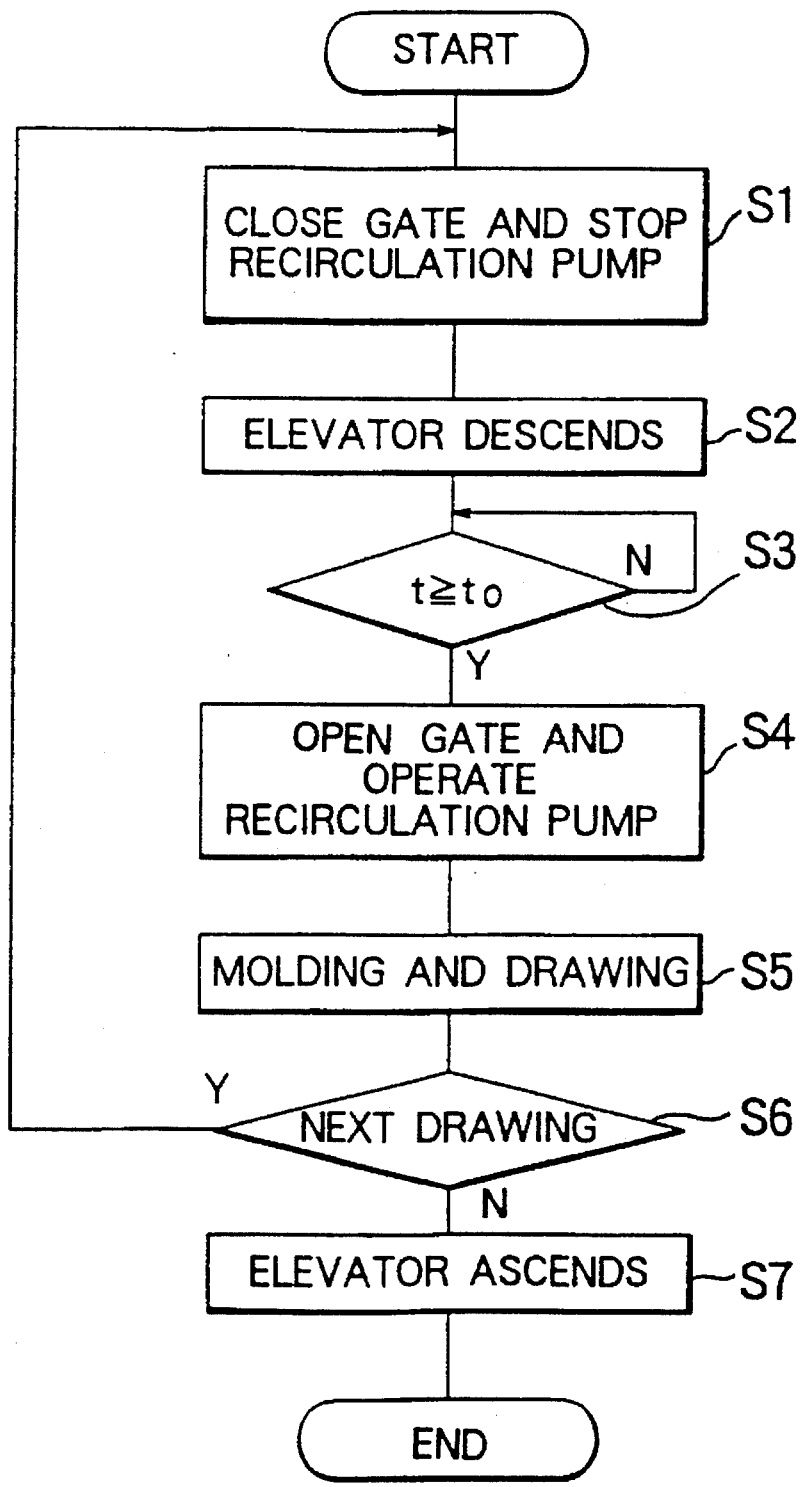
FIG. 5 is a flow chart showing the processing routine in the control unit according to the embodiment.

FIG. 5 is a flow chart showing the processing routine in the control unit of the present embodiment.

In the conventional optical molding process, when the drawing at one constant-height section ended and the elevator was made to descend, the amount of the photocurable resin liquid which overflowed was left to chance, but in the present embodiment, when the elevator is made to descend, the gate 10 is closed or restricted to temporarily block the overflow and further recirculation is stopped (or restricted) such as by stopping the recirculation pump 14 to allow the liquid surface 3 of the photocurable resin liquid tank 1 to settle, then the gate 10 is opened so as to allow overflow of exactly the amount of the photocurable resin liquid 2 which should truly overflow.

For the drawing at one constant-height section, first a light beam 5 including a wavelength suitable for curing the photocurable resin liquid 2 is generated from the optical scanning unit 4 and this light beam 5 is made to scan the photocurable resin liquid 2 contained in the photocurable resin liquid tank 1. At this time, the elevator 8 is immersed from the liquid surface 3 by exactly the thickness of the constant-height section to be drawn.

When the scanning at one constant-height section ends, the cured resin 7 produced by the irradiation of the light beam 5 is made to descend by the elevator 8. This routine is repeated to successively build up scanned and cured layers 7.

At this time, if a signal is received by the control unit 6 from the optical scanning unit 4 to the effect that the drawing at one constant-height section has ended, a signal is output to the elevator actuator 15 to cause descent by exactly the thickness of the constant-height section to be next molded. At the same time as this, a signal is output from the control unit 6 to the actuator 12 to temporarily block the photocurable resin liquid 2 overflowing from the photocurable resin liquid tank 1 to the overflow tank 13 and a signal is output to the recirculation pump 14 as well to stop (step 1).

The elevator 8 starts its descent (step 2). In this embodiment, the descending operation of the elevator includes a descent once to a depth greater than the thickness of the constant-height section layer to be next molded and then an ascent to the thickness position of the constant-height section layer. By this, sufficient photocurable resin liquid is filled on the elevator, so even if the viscosity of the photocurable resin liquid is high, due to the action of surface tension etc., it is possible to prevent the liquid surface on the elevator from falling.

In this state, the operation is stopped until a predetermined time passes (step 3). This is for reducing the rise of the liquid surface due to the descent of the elevator 8 and the rippling of the liquid surface. Accordingly, in accordance with the invention, it is necessary to delay for a reduced period of time compared to the prior art.

Next, since the rise of the liquid surface 3 and the rippling of the liquid surface 3 are reduced by step 3, a signal is output from the control unit 6 to the actuator 12 to open the gate 10. At the same time as this, a signal is output from the control unit 6 to the recirculation pump 14 to start the recirculation between the photocurable resin liquid tank 1 and the overflow tank 13 (step 4).

By this, just the amount of photocurable resin liquid which should truly overflow overflows from the photocurable resin liquid tank 1 to the overflow tank 13. As a result, it is possible to immediately start the scanning at the next constant-height section (step 5). Further, the liquid surface 3 at the start of the scanning is secured at the normal liquid surface height and, further, rippling is Suppressed, so the precision of the model also remarkably rises.

Finally, when the drawing in all of the constant-height sections has been finished, the elevator 8 is made to ascend and the molded model is taken out (steps 6 to 7).

Note that the embodiments explained above were described in a manner for facilitating understanding of the present invention and were not described to limit the invention. Therefore, the elements disclosed in the embodiments include all design modifications and equivalents falling under the technical scope of the present invention.

For example, the gate 10 at step 1 need not be completely closed. That is, if it is closed so that there is some clearance between the top edge 11 of the photocurable resin liquid tank 1 and the gate 10, the overflow of the photocurable resin liquid can be made appropriate, so there is no longer a need for stopping the recirculation pump 14 at step 3.

Although the present invention has been described with reference to a specific embodiment, those of skill in the art will recognize that changes may be made thereto without departing from the scope and spirit of the invention as set forth in the appended claims.

I claim as my invention:

1. An optical molding process for obtaining a three-dimensional resin model comprising the steps of:

providing a photocurable resin liquid tank having a supply of photocurable resin liquid therein and an elevator in the photocurable resin liquid tank;

scanning a surface of the photocurable resin liquid accommodated in the photocurable resin liquid tank with a light beam to cure a first three-dimensional layer of the photocurable resin liquid between the surface of the photocurable resin liquid and the elevator;

arranging an overflow tank in flow communication with said photocurable resin liquid tank;

blocking temporarily an overflow of the photocurable resin liquid from the photocurable resin liquid tank to said overflow tank;

making the elevator descend;

releasing blocking of the overflow of the photocurable resin liquid from the photocurable resin liquid tank to said overflow tank: and molding a next three-dimensional constant-height section layer on said first three-dimensional layer after releasing said blocking of the overflow.

2. An optical molding process as recited in claim 1, said step of making the elevator descend comprising steps of:

making the elevator descend to a depth greater than a thickness of the constant-height section layer to be next molded; and making the elevator ascend to a thickness position of the constant-height section layer.

3. An optical molding process as recited in claim 1, comprising the further steps of:

providing a conduit for recirculating resin liquid from the overflow tank back to the resin liquid tank;

recirculating resin liquid from the overflow tank back to the resin liquid tank;

stopping recirculation between the photocurable resin liquid tank and the overflow tank during said step of blocking the overflow.

4. An optical molding process as recited in claim 2, comprising the further steps of:

providing a conduit for recirculating resin liquid from the overflow tank back to the resin liquid tank;

recirculating resin liquid from the overflow tank back to the resin liquid tank;

stopping recirculation between the overflow tank and the photocurable resin liquid tank during said step of blocking the overflow.

5. An optical molding process for obtaining a three-dimensional resin model comprising the steps of:

providing a photocurable resin liquid tank having a supply of photocurable resin liquid therein and an elevator in the photocurable resin liquid tank;

scanning a surface of the photocurable resin liquid accommodated in the photocurable resin liquid tank with a light beam to cure a three-dimensional layer of the photocurable resin liquid between the surface of the photocurable resin liquid and the elevator;

arranging an overflow tank in flow communication with said photocurable resin liquid tank;

restricting temporarily an overflow of the photocurable resin liquid from the photocurable resin liquid tank to an overflow tank;

making the elevator descend;

decreasing said restricting of the overflow; and molding a next constant-height three-dimensional section layer after decreasing said restricting of the overflow.

6. An optical molding process as recited in claim 1, said step of making the elevator descend comprising steps of:

making the elevator descend to a depth greater than a thickness of the constant-height section layer to be next molded; and making the elevator ascend to a thickness position of the constant-height section layer.

7. An optical molding process as recited in claim 5, comprising the further steps of:

providing a conduit for recirculating resin liquid from the overflow tank back to the resin liquid tank;

recirculating resin liquid from the overflow tank back to the resin liquid tank;

restricting recirculation between the overflow tank and the photocurable resin liquid tank during said step of restricting the overflow.

\* \* \* \* \*